March 26, 1929.  W. BLUME  1,706,767
MATRIX SETTING AND LINE CASTING MACHINE
Filed Feb. 7, 1928
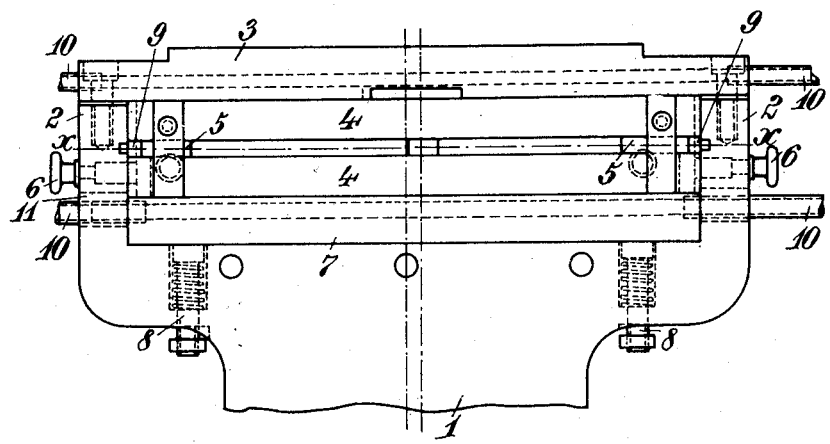
Inventor:
W. Blume
By: Marks & Clark
Attys.

Patented Mar. 26, 1929.

1,706,767

UNITED STATES PATENT OFFICE.

WILHELM BLUME, OF BERLIN-TEGEL, GERMANY, ASSIGNOR TO THE FIRM TYPOGRAPH G. M. B. H., OF BERLIN, GERMANY.

MATRIX-SETTING AND LINE-CASTING MACHINE.

Application filed February 7, 1928, Serial No. 252,604, and in Germany April 1, 1927.

In adjustable moulds of matrix-setting and line-casting machines in which the central line of the mould slot is always at the same level, the line thickness or font is varied by fitting thicker or thinner upper and lower filling or distance pieces to the mould, so that for example six dissimilar fonts involve the use of six pairs of filling pieces of dissimilar thickness. Thus the space provided for accommodating the mould in its holder is always accurately filled so that the lower mould-support and the upper filling bar of the mould holder (which are the means through which the cooling liquid flows) are in intimate contact with the mould for the purpose reliably dispelling the heat thereof.

The invention aims at adjusting the mould with the aid of a smaller number of removable elements than was hitherto possible.

According to this invention, only one pair of filling pieces for each font is required for forming the various fonts, but provisions must be made to maintain the central lines of the variously set moulds in unaltered position, i. e. these lines must all coincide. To this end, removable insertion pieces (each corresponding in size to a particular width of mould slot) are placed in lateral guides of the mould holder at the level of the central axis of the mould slot so that the position of the said axis always remains unchanged. Moreover, the position of the elements through which the cooling medium flows is variable so that these elements firmly bear against the longitudinal edge faces of the mould.

The accompanying drawing shows a side elevation of a constructional example according to the invention.

The mould holder 1 has lateral guides 2 between which a connecting member 3 is disposed, which also performs the duty of a cooling element. Removable insertion pieces 5 are on either side of the mould between the longitudinal members thereof. The mould is held in its horizontal position by pins 6 engaging in vertical slots in members 4. A cooling element 7 is between the lower longitudinal mould member 4 and the holder 1, the said element being pressed against the mould from below by resilient bolts 8, which may be replaced by set screws.

Spacing pieces 9 are supported in the guides 2 of the mould holder and project laterally into the slot of the mould. These distance pieces are changed when the width of the slot is altered, but the position of the central plane $x$—$x$ of the slot always remains the same. The mould slot is narrowed by replacing the insertion and spacing pieces by narrower pieces, whereby the outer edges of the longitudinal mould members 4 move towards one another and are out of contact with the inner edge faces of the elements 3 and 7, so that uniform and efficient cooling is impaired. This is remedied by movably mounting the said members 3 and 7, so that when the mould is narrower both these members may be moved to contact intimately with the mould. Cooling water flows into and out of the members 3 and 7, so that when the mould is narrower both these members may be moved to contact intimately with the mould. Cooling water flows into and out of the members 3 and 7 through pipe connections 10 which of course must move together with the members 3 and 7. Slots 11 for accommodating the pipe connections 10 are provided in respect of the member 7.

The pieces 9 and 5 may if necessary be integral one with the other.

Having now particularly described and ascertained the nature of my said invention and in what manner the same is to be performed, I declare that what I claim is:

1. In a matrix-setting and line-casting machine a mould holder with lateral guides, a mould having removable lateral insertion pieces and movable longitudinal members, said removable lateral insertion pieces situated between said guides and separate pieces being removably disposed in the lateral guides of the mould holder at the level of the central axis of the mould slot and extending into the latter.

2. In a matrix-setting and line-casting machine a mould holder with lateral guides, a mould having removable lateral insertion pieces and movable longitudinal members, separate pieces being removably disposed in the lateral guides of the mould holder at the level of the central axis of the mould slot, and adjustable members forming part of the mould holder and leading the cooling medium along the longitudinal members of the mould.

In testimony whereof I affix my signature.

WILHELM BLUME.